US006886081B2

(12) United States Patent
Harres

(10) Patent No.: US 6,886,081 B2
(45) Date of Patent: Apr. 26, 2005

(54) METHOD AND TOOL FOR DETERMINING OWNERSHIP OF A MULTIPLE OWNER LOCK IN MULTITHREADING ENVIRONMENTS

(75) Inventor: John M. Harres, Thornton, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 225 days.

(21) Appl. No.: 10/245,069

(22) Filed: Sep. 17, 2002

(65) Prior Publication Data

US 2004/0054861 A1 Mar. 18, 2004

(51) Int. Cl.[7] .............................................. G06F 12/00
(52) U.S. Cl. ...................... 711/152; 711/104; 711/105; 711/152; 711/154; 711/161; 711/162; 711/163; 718/100; 718/102; 718/104
(58) Field of Search ...................... 711/101–105, 152, 711/154, 161–163, 144–145, 1; 718/100–102, 104; 707/8; 710/8, 18, 30, 200, 244

(56) References Cited

U.S. PATENT DOCUMENTS

| 5,285,528 | A | * | 2/1994 | Hart ........................... 710/200 |
| 5,608,893 | A | | 3/1997 | Slingwine et al. |
| 5,832,484 | A | * | 11/1998 | Sankaran et al. ............... 707/8 |
| 5,987,506 | A | * | 11/1999 | Carter et al. ................. 709/213 |
| 6,081,665 | A | * | 6/2000 | Nilsen et al. ................ 717/116 |
| 6,105,050 | A | | 8/2000 | Govindaraju et al. |
| 6,112,222 | A | | 8/2000 | Govindaraju et al. |
| 6,182,186 | B1 | * | 1/2001 | Daynes ........................ 710/200 |
| 6,219,690 | B1 | | 4/2001 | Slingwine et al. |
| 6,301,676 | B1 | | 10/2001 | Kumar et al. |
| 6,574,654 | B1 | * | 6/2003 | Simmons et al. ............ 718/104 |
| 2002/0078119 | A1 | * | 6/2002 | Brenner et al. ............. 709/102 |
| 2003/0188227 | A1 | * | 10/2003 | Maison et al. ................ 714/42 |

OTHER PUBLICATIONS

Anderson et al, Dec. 1989, IEEE Transaction on Computers, vol. 38, pp. 1631–1644.*

* cited by examiner

Primary Examiner—Donald Sparks
Assistant Examiner—Hashem Farrokh
(74) Attorney, Agent, or Firm—Kent A. Lembke; William J. Kubida; Hogan & Hartson LLP

(57) ABSTRACT

A method for determining an ownership of for a multiple owner lock. The method includes determining potential owners of the lock by inspecting a core file of a computer system or memory of a live system to determine which threads have pointers to the lock. The method includes identifying a stack for the threads with a stack pointer pointing to the current active frame and dividing the stack into active and inactive portions. The stack information is examined for each potential owner of the lock for pointers to the lock. If the thread has a pointer to the lock in the inactive portion of the stack, the thread is removed from the set of potential owners. The method includes retrieving a waiting list for the lock, and any threads on the waiting list are removed from the set of potential owners.

20 Claims, 3 Drawing Sheets

METHOD AND TOOL FOR DETERMINING OWNERSHIP OF A MULTIPLE OWNER LOCK IN MULTITHREADING ENVIRONMENTS

BACKGROUND OF THE INVENTION

1. Field of the Invention

The present invention relates, in general, to managing shared resources in a computer system with a multithread processing environment, and, more particularly, to software, systems and methods for determining ownership of a lock to a computer system resource that can be owned by multiple threads.

2. Relevant Background

Computer system designers and analysts face the ongoing and often difficult task of determining how to fix or improve operation of a computer system that has experienced an unexpected exception or is failing to operate as designed (e.g., is experiencing errors caused by software problems or "bugs"). When a problem or bug in the computer system software is serious enough to stop or interrupt the execution of a running program, this failure is known as a crash. Often, computer systems may simply fail to operate as efficiently and quickly as possible due to inefficient or slow processing by one or more processes that block access by other process to computer system resources, such as to memory or a processor. Hence, one problem facing system designers and analysts is how to make computer systems including operating systems more effective in managing concurrent processing and resource management.

Computer systems often support processes with multiple threads of execution (i.e., threads) that can work together on a single computational task. The term "thread" in a general sense refers merely to a simple execution path through application software and the kernel of an operating system executing with the computer. Threads share an address space, open files, and other resources but each thread typically has its own stack in memory that contains the thread execution history with one frame for each procedure or function called but not yet returned from, e.g., a frame in the thread stack may include a pointer to read functions, write functions, and resources which the thread is waiting for access. Similarly, each thread of the process typically has its own stack maintained by the system processor divided into a set of active frames and a set of inactive frames for threads or functions that have been called and returned. One of the challenges in using multithreading is to synchronize the threads and processes so that they do not interfere with each other. This is typically accomplished through mutual exclusion locks (mutex locks), which are used to ensure that only one thread or process at a time performs a particular task or has access to specific items of shared data.

A thread typically attempts to "acquire" a lock before executing a critical section of code or accessing specific items of shared data. If no other thread presently holds the lock, the thread acquires the lock by setting the lock to a locked state. After acquiring the lock, the thread is free to execute the critical section of code or manipulate the items of shared data without interference from other threads. While the thread holds the lock, other threads attempting to acquire the lock will "block" waiting for the lock, and will not be able to proceed until the lock is released. After the thread completes the task, it releases the lock, thereby allowing other threads to acquire the lock. The kernel maintains a list of threads waiting to obtain the lock (e.g., sleeping on a lock) to know what threads to wake up when the lock is released.

To assist in identifying bugs in the software operating on a computer system such as those that cause unexpected or unacceptable hangs, software applications are often configured to write a copy of the memory image of the existing state of the application or kernel at the time of the crash or exception into a file. These memory image files are sometimes called core files or core dumps. The system-level commands or programs in the operating system, i.e., the kernel software, are of particular interest to system analysts in correcting bugs in a crashed computer system. For example, in UNIX®-based systems, the kernel is the program that contains the device drivers, the memory management routines, the scheduler, and system calls. Often, fixing bugs begins with analysis of these programs, which have their state stored in a core file. Similarly, at the user level or in the user space, programs or binaries (e.g., binary, machine readable forms of programs that have been compiled or assembled) can have their state stored in user core files for later use in identifying the bugs causing the user applications to crash or run ineffectively.

However, debugging a program, application, or kernel based solely on the core file can be a very difficult and time-consuming task in multithreading environments in which crashes or inefficiencies are caused by hangs due to a thread blocking access to a particular shared resource. In some cases, the kernel stores ownership information for each active lock indicating the thread of execution holding the lock. In contrast, many multi-process and multithreading environments utilize locks that can be owned by multiple owners, i.e., multiple owner locks. Typically, the kernel does not store ownership information for multiple owner locks because it would be difficult and inefficient to maintain an arbitrary length list of owners that generally is only useful for debugging owner programs or threads. When a core file is examined that includes a multiple owner lock, a debugger can readily identify the lock that is causing operation problems such as an unacceptable hang, but debugging then becomes difficult as the debugger cannot readily identify the thread that owned the lock at the time of the hang.

Hence, there remains a need for improved methods and mechanisms for use in determining ownership of a multiple owner lock based on a crash dump or a core file from a computer system or memory of a live system with a multithreading operating environment.

SUMMARY OF THE INVENTION

The present invention addresses the above problems by providing a method for determining an owner or set of owners for a lock to a system resource being shared by a number of threads of execution in a computer system. The lock is typically a multiple owner lock and the method includes determining a set of potential owners of the lock by inspecting a core file or active memory image of the computer system to determine which threads have pointers to the lock in their stack. The method includes identifying which lock to examine for ownership such as by looking for a lock that resulted in too many or too long of hangs for threads or that caused a system panic or crash. The set of potential owners may include numerous threads that can be reported to a debugger or to a requesting client. The number of threads that may own the lock may still be large making it difficult to quickly determine which underlying threads or processes need to be debugged or redesigned. Therefore, several embodiments of the inventive methods include one or more optimization processes to reduce the number of potential owners to one or more threads.

In some embodiments, the method includes identifying a process stack for the computer system with an active stack pointer pointing to the active frame in the stack. This pointer divides the stack into an active portion and an inactive portion. The method continues with examining the stack information for each thread in the set of potential owners of the lock for references or pointers, such as local variables including a pointer to the lock in the thread or process stack. If the pointer to the lock is determined to be in the inactive portion of the stack, the thread is removed from the set of potential owners of the lock, thereby reducing the number of threads that need to be evaluated for ownership of the lock. In other embodiments, the method includes retrieving a list of threads waiting for the lock (such as a sleep queue maintained by the lock to allow the lock to know which processes are waiting for ownership). Any threads on the waiting list are removed from the set of potential owners because a thread typically would not request ownership of a lock or a resource that it already owned. In some cases, both of these optimization techniques are employed to reduce the number of potential owners to one thread or to a small number of threads to significantly enhance debugging of processes and threads in a multithreading environment in which the kernel does not track lock ownership.

DETAILED DESCRIPTION OF THE PREFERRED EMBODIMENTS

Figure 1:
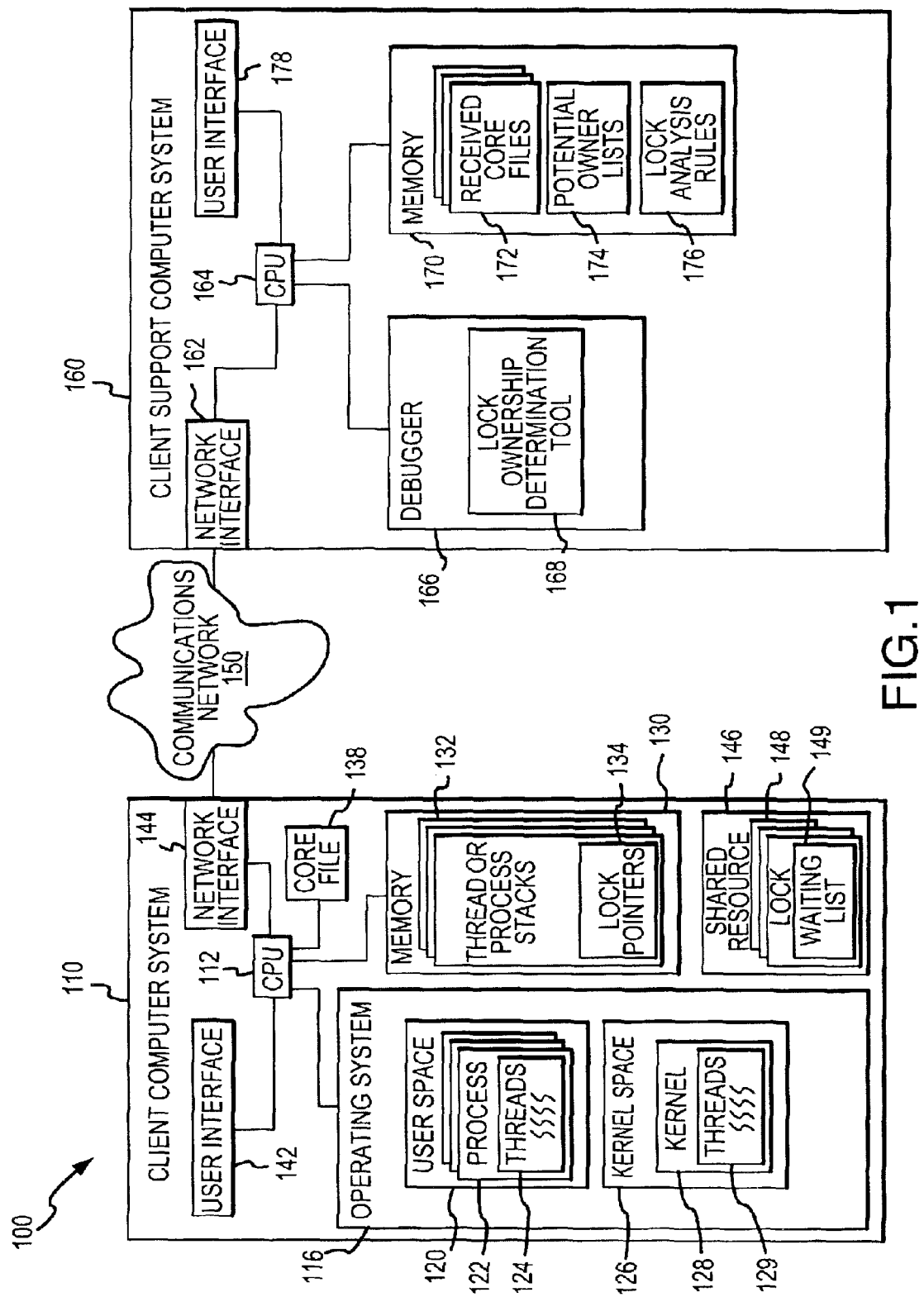
FIG. 1 illustrates in block diagram form a technical support system according to the present invention including a client support computer system utilizing a debugger with a lock ownership determination tool for determining a set of threads that are likely to own a lock to a shared computer system resource.

In the following discussion, computer systems and network devices, such as client computer system 110 and client support computer system 160 of FIG. 1, are described in relation to their function rather than as being limited to particular electronic devices and computer architectures. To practice the invention, the computer and network devices may be any devices useful for providing the described functions and may include well-known data processing and communication devices and systems such as personal, laptop, and notebook computers with processing, memory, and input/output components and server devices configured to maintain and then transmit digital data over a communications network. Data, including client requests and transferred core files and transmissions to and from the client support computer system, typically is communicated in digital format following standard communication and transfer protocols, such as TCP/IP, HTTP, HTTPS, and the like, but this is not intended as a limitation of the invention. The invention is directed generally toward debugging programs and applications including user programs and kernels and is intended to be used for determining ownership of a lock on a shared resource in a client computer system typically based on a core file, but is not limited to a specific programming language, operating system, or computer system hardware and/or software configuration.

FIG. 1 illustrates an exemplary technical support system 100 incorporating a client support computer system 160 that is configured according to the invention to assist a user or debugger in determining which thread (kernel or user application thread) owned a multiple owner lock at the time a core file or crash dump file was created for the client computer system 110. As will be appreciated by those skilled in the art, the method of determining lock ownership typically will be performed using a core file but certainly is not limited to this technique and can be performed on a live system using similar information obtained from memory as available in a core file. During typical operation of the system 100, a client (such as client computer system 110) transmits a request for assistance in identifying a cause data and/or memory corruption occurring during operation of their system, such as in response to a system crash or panic. The assistance request includes a copy of the core file or crash dump 138 for the system 110 or portion of the system (or this file is obtained later) and the client support computer system 160 acts to debug a program that caused the problem or crash based on the core file 138 and such debugging is facilitated by features of the invention that enable a debugger to determine more accurately which thread of execution in the computer system 110 had ownership of a lock that caused other threads to hang or to be blocked from a shared system resource.

As shown, the system 100 includes a client computer system 110 linked to the client support computer system 160 via communications network 150 (e.g., the Internet, a LAN, a WAN, and the like) for communicating debugging requests, for transferring copies of core files 138 (or other program information), and for reporting debugging results from the client support computer system 160 to the client computer system 110 including one or more likely owners of a particular lock. The client computer system 110 may take many forms but generally will include at least one CPU 112 to manage operation of the system 110 including functioning of the operating system 116, storage of data in memory 130, display of data or information to a user via a user interface 142 (such as a GUI or command line interface), and communications with other devices over network 150 via network interface 144. The CPU 112 (or a program in system 110) is adapted to generate a core file or memory image file 138, such as in response to a system panic, an extended hang, or during active operation of the system 110, that includes information pertaining to or images of the current state of memory 130 (including information in process or thread stacks 132) at the time of the panic or the generation of the core file 138. A copy of core file 138 is typically provided to the client support computer system 160 as part of a request for assistance in debugging the system 110 or more specifically, in identifying which thread of execution may be malfunctioning or inefficiently designed based on its ownership of a lock to a resource such as shared portions of memory 130.

The operating system 116 may take many forms such as Solaris, UNIX, PICK, MS-DOS, LINUX, and the like and generally is a software program that manages the basic operations of the computer system 110. The operating system 116 is shown divided into a user space 120 that is accessible by users and a kernel space 126 that is generally not accessible by users. The user space 120 includes one or more processes 122, i.e., a user program in execution, using multiple threads of execution or threads 124 scheduled to execute within the address space of the process 122. Each executing process 122 has a stack 132 in memory 130 with pointers 134 to locks it could own and similarly, each thread 124 has its own stack 132 with pointers 134 to each lock it could own (such as a lock registry). The kernel space 126 includes a kernel 128 that may also include threads 129. The kernel 128 is a portion or level of the operating system 116 that is always running when the operating system 116 is running and contains system-level commands or all the functions hidden from the user including device drivers, memory management routines, the scheduler, and system calls.

Because the computer system 110 provides for multi-processing and multithreading, the operating system 116 is required to control access and timing of access to a number of shared resources 146 (such as shared memory used for read/writes by threads 124 of a process 122). For each shared resource 146 there may be one or more locks 148 (such as mutex locks, semaphore locks, and the like) and at least a portion of these locks 148 are configured for multiple ownership, which typically leads to the kernel 128 not storing ownership information for these multiple owner locks 148. A number of locks 148, such as read/write locks, semaphore locks, and the like, have to be aware of which threads 124 or processes 122 are waiting to take ownership of the lock 148. In general, a semaphore is a lock that stores a count of how many threads or processes may use a shared resource at a time. For example, a resource may be a set of buffers for data and the semaphore would contain the number of buffers available. When a thread needs a buffer, it grabs a semaphore and the semaphore's count goes down, and when the thread is done, it returns the semaphore and the count goes up. When the count becomes zero and another thread tries to get a buffer, all of the buffers are in use and the thread sleeps until a buffer becomes available. Ownership of other multiple owner locks, with similar attributes to read/write locks and semaphores, can be resolved using the present invention and will be apparent to those skilled in the art.

In this regard, the locks 148 are shown to store waiting or queued threads 124 or processes 122 in a waiting list or sleep queue 149. These waiting lists 149 are useful for determining which of the threads 124 own a multiple owner lock 148 by providing a list of the threads 124, i.e., the waiting threads 124, that are not the current owner as it is unlikely that a current owner of a lock would be waiting to regain ownership. Such elimination of potential owners is explained in more detail with reference to FIG. 2 and operation of the system 100.

In response to a user instruction or upon a crash of system 110, the CPU 112 acts to generate a core file 138 which is a core image providing a state of the computer system 110 at the time of the core dump and includes a state of the thread or process stack 132 for the program 122 and/or for the threads 124 corresponding to the process 122, running at the time of the crash or core dump and includes assembly code for all the functions in the user process 122 or kernel 128. During operation, an operator of the system 110 may transmit a request for assistance (e.g., debugging help) over the network 150 to the client support computer system 160. A copy of the core file 138 (or a memory image or memory information file for an active system) is transmitted with the request or separately to the client support computer system 160 via communications network 150 or otherwise (such as on a disk or other portable memory device).

The client support computer system 160 includes a network interface 162 communicatively linking the system 160 to the communications network 150 and communicating with the client computer system 110. The client support computer system 160 includes a CPU 164 managing operations of the system 160 including the debugger 166, the user interface 178 (such as a command line interface, GUI, and the like), and the memory 170. Received crash dumps or core files 172 are stored by the CPU 164 in memory 170 for later processing by debugger 166. Also stored in memory 170 are lists or sets of potential owners of particular locks 174, e.g., result sets identifying threads 124 that may own a lock being analyzed by the system 160. Additionally, lock analysis or optimization rules 176 are stored in memory 170 and include techniques that can be used for different types of locks to reduce or narrow the number of potential number of owners of a lock to a small number and often to a single owner or thread. As with the client computer system 110, the client support computer system 160 and its hardware and software components may take numerous forms and configurations to practice the invention.

The debugger 166 is generally a software and/or hardware mechanism that functions to process the received core file 172 at the instruction of a user via user interface 178 and/or automatically to determine a one or more threads 124 (or kernel threads 129) that may own a particular lock as indicated by stack and other information in the received core files 172 (e.g., a copy of crash dump or core file or memory image 138). In this regard, a lock ownership determination tool 168 is provided to process the received core files 172 and interact with an operator (i.e., a debugger) of the user interface 178 to identify a potential list of owners 174 among the threads 124, 129 for a particular multiple owner lock 148, with the lock 148 of interest typically being linked to panic or to hanging of one or more threads for an unacceptable period of time. The functioning of the lock ownership determination tool 168 is described in detail with reference to FIGS. 2 and 3.

Figure 2:
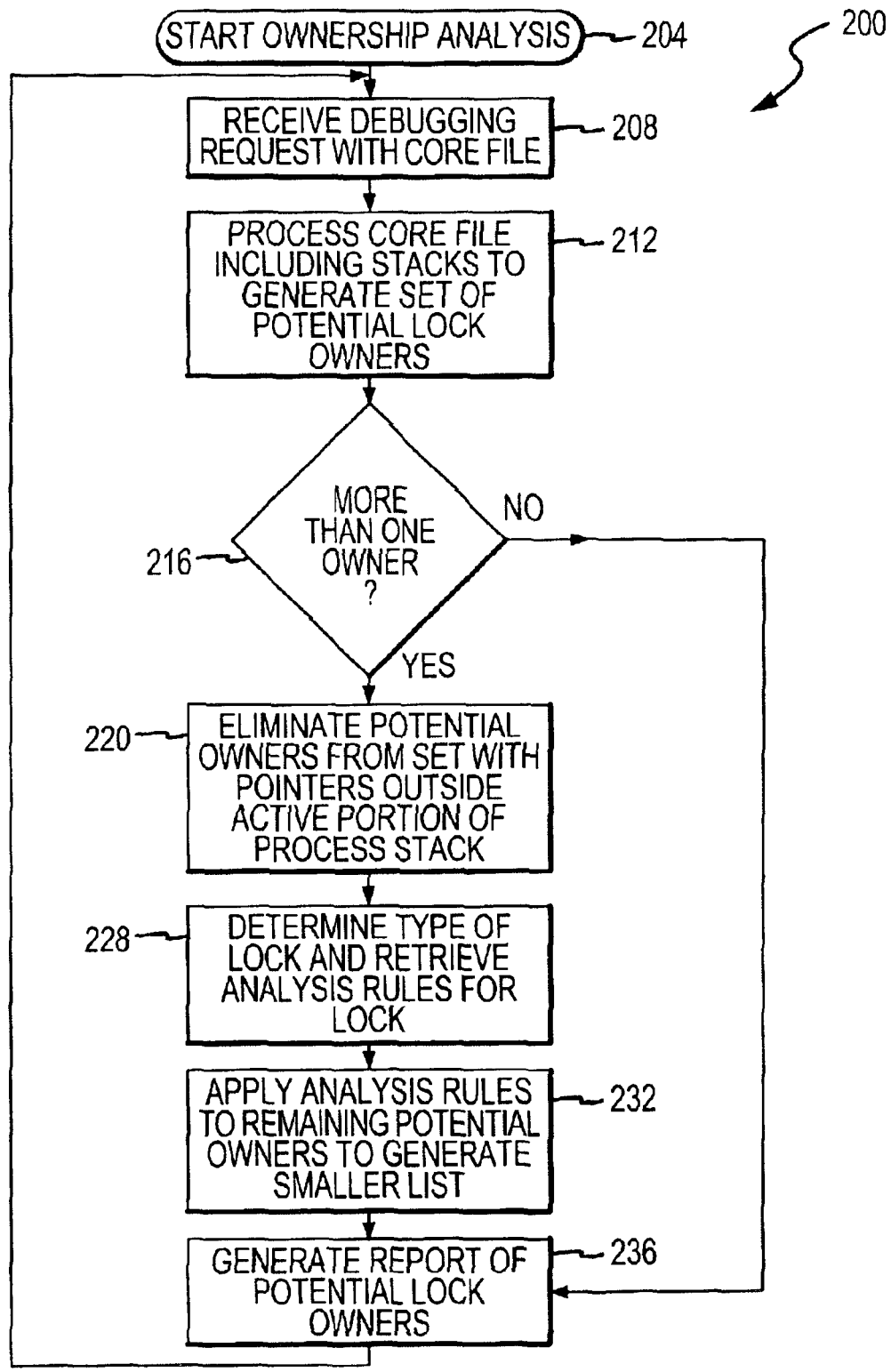
FIG. 2 is a flow chart illustrating an exemplary lock ownership analysis performed by a debugger of the present invention such as the debugger of the technical support system of FIG. 1.

FIG. 2 illustrates a lock ownership determination process 200 performed by the ownership determination tool 168 during operation of the system 100. As shown, the process 200 starts at 204 typically by loading the tool 168 into the debugger 166. At 208, a copy of a crash dump or core image file 138 is received typically as part of a debugging or assistance request from client computer system 110 and is stored as a received core file 172 in memory 170. Each core file 172 typically provides information that allows a debugger and/or the tool 168 to identify the executing process(es) 122 and the corresponding threads 124 of such process 122. The core files 172 typically include state information for the processes 122 and threads 124, 129 and information stored in stacks 132 including pointers 134 from the processes 122 and threads 124, 129 to the referenced or owned locks 148.

At 212, the tool 168 functions to process the core file 172 to determine a list of potential owners of a particular problematic lock 148 to a shared resource 146. The process 200 may be applied to determination of lock ownership by processes 122 in multi-process environments and by kernel threads 129, but for simplification and clarity of explanation, user threads 124 are described as being the potential owners of the lock 148 being examined for ownership. As a preliminary step at 212, the tool 168 may first process the received file 172 to identify an active lock 148 to a shared resource 146 that caused the panic as may be evidenced by a plurality of hangs or threads 124 waiting for the lock 148 and/or shared resource 146. In some cases, the core file or memory image or information 138 may be generated for an active system 110 and not based on a panic or crash. In these cases, the analysis 200 may proceed for a particular shared resource 146 and its lock 148 or for the only active lock in the file 172 (or for a particular lock 148 known to cause problems in operation efficiency).

At 212, once the particular lock 148 is identified, the tool 168 generates a list of potential owners 174 of the lock 148. This is achieved by examining the stacks 132 for lock pointers 134 to the lock 148. Each thread including a matching lock pointer 134 is then identified as potential owner of the lock 148 (and stored in lists 174) and may need debugging or reprogramming to enhance the efficiency of the system 110 or to avoid unacceptable bangs in future operations of system 110. Depending on the process 122 the number of threads 124 that are included in the list 174 created in step 212 may be relatively large making it still a difficult task for a user of the list 174 from step 212 to determine the actual owner of the lock 148. Hence, in some embodiments, it is useful for the process 200 to continue to process the list 174 and core image file 172 to eliminate threads 124 from the list 174 that are most likely not the owner of the lock 148 at the time the file 172 was generated by system 110.

At 216, the tool 168 checks the list 174 from step 212 to determine if there are two or more threads 124 in the list 174, which indicates further processing or optimization may be useful to identify lock ownership (i.e., a multiple-owner lock is indicated). If only one thread 124 remains in list 174, the thread 124 is identified as the likely owner of the lock 148 and process 200 continues at 236 with generation of a report including information on the determined lock ownership. Otherwise, at 220, the tool 168 retrieves the process stack pointer for each of the remaining threads 124 in the list 174 from information in file 172 for their stack 136 and determines the range of addresses to frames in an active portion of the process stack. If a thread's process stack pointer is outside the active portion, the thread 124 is removed from the potential lock owner list 174.

Figure 3:
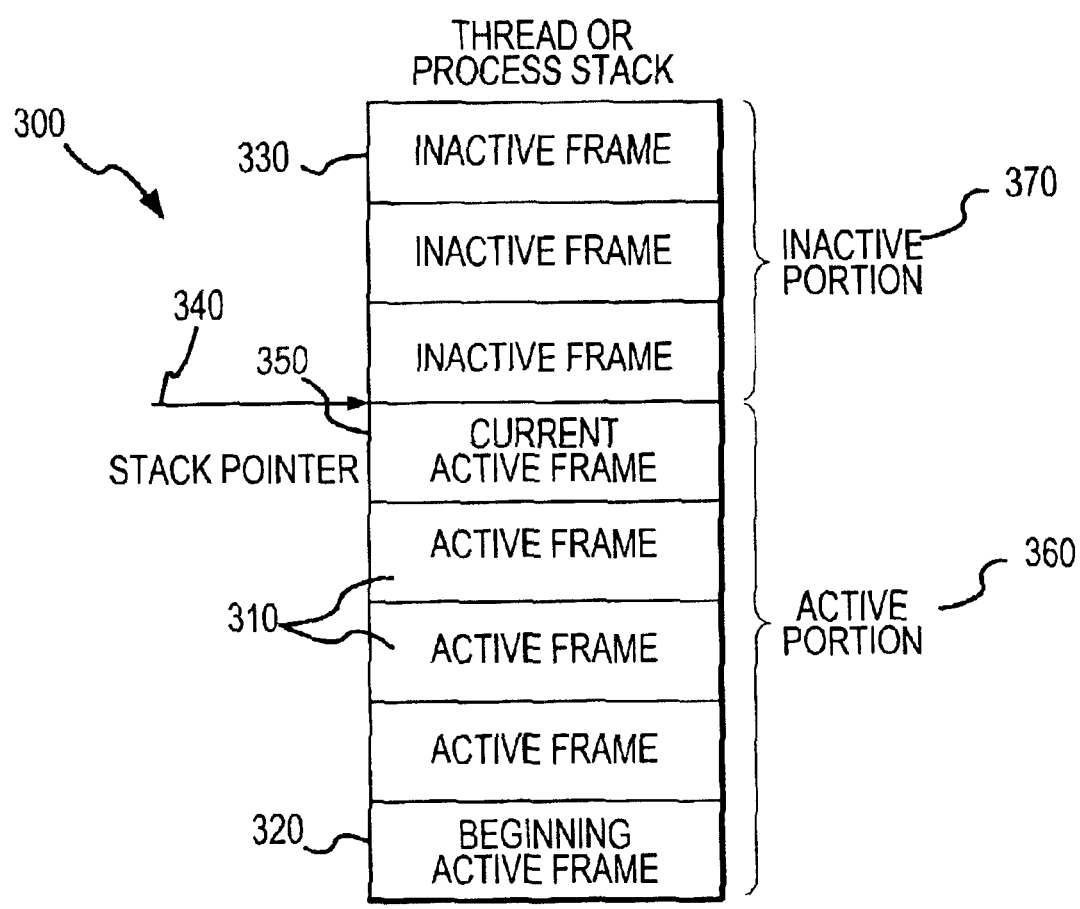
FIG. 3 is an illustration of a simplified process stack illustrating active and inactive frames within the stack useful for eliminating threads as potential owners of a particular lock.

FIG. 3 illustrates an exemplary stack 300 with a number of frames 310 for active functions that may be maintained by CPU 112 for a process 122 with threads 124 with each frame 310 storing register information for a function. The illustrated stack 300 is built from the bottom to the top (although in some cases, stacks can be built from the top to the bottom) from a beginning active frame 320 to a current or most recently called active frame 350. A stack pointer 340 from the CPU 112 is provided that points to the active location or current active frame 350 in the thread or process stack 300 and, thus, defines an inactive portion 370 of the stack 300 above it in the stack 300 (in the range from just above the current active frame 350 to the end 330 of the stack 300) and an active portion 360 of the stack 300 from the beginning active frame 320 through the current active frame 350.

Referring to FIGS. 2 and 3, at 220 in the process 200, the tool 168 functions to compare the stack pointer for each thread 124 in the potential owner list 174 and when the lock pointer is in the inactive portion 370 of the stack 300, the tool 168 removes that thread 124 from the list 174 of potential owners of the lock 148. For example, a thread may have the address of the lock (i.e., a pointer to the lock) in the inactive portion 370 of its stack 300, and this would indicate that the thread 124 is not the owner of the lock 148. The list 174 can be narrowed effectively in this manner, but in many cases, the list 174 may still contain a number of threads 124 as potential owners, which indicates further processing by the tool 168 may be useful in identifying the actual owner of the lock 148.

At 228, the process 200 continues with the tool 168 determining the type of lock 148 being analyzed and in response, retrieving from the lock analysis rules 176 a set of rules specific to the lock 148. Each lock type may have unique operational requirements, such as requiring certain information be linked to or stored by the threads or by the locks 148 themselves, that can be used to generate a set of analysis parameters or rules that enable the tool 168 to eliminate certain threads 124 as candidates for ownership of a particular lock 148. At 232, the analysis rules are applied to the threads 124 remaining in the list 174 and if appropriate, one or more of the threads 124 is removed from the list 174 as not being a likely lock owner.

For example, most locks 148, including read/write locks, must know the threads 124 that are waiting on the locks 148 to operate properly, and in response, each of these locks 148 (or, typically, the kernel 128) stores a list of threads waiting for the lock (i.e., a waiting list or sleeping queue) 149. For these locks 148, the tool 168 at 232 compares the waiting list 149 to the threads 124 in the list 174 and removes any matching threads 124 because a thread 124 waiting for lock 148 is unlikely to be the lock's present owner. At 236, the list 174, which often only contains one or a few threads 124 is included in a report that is provided to a debugger or analyst such as via user interface 178 and/or that is transmitted to the client computer system 110. The process 200 then continues with processing of additional core files 172 (or active system memory images) or waiting for and receiving additional core files from the system 110.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. For example, lock ownership determination tool 168 and other components of the system 160 may be incorporated into the client computer system 110 or be provided in a more distributed fashion on two or more systems and/or devices. The above examples stress the use of the lock ownership determination techniques with core files or crash dumps as this is a common use but the inventive techniques are similarly useful with examining live systems to identify lock ownership(s).

I claim:

1. A computer-based method for determining an owner of a lock on a shared resource in a computer system, comprising:

receiving a core file generated in the computer system providing state information for memory in the computer system including stack information for threads in the computer system; and processing the core file for the computer system to generate a list of potential owners of the lock, wherein the lock is configured for multiple ownership with a kernel for the computer system not storing lock ownership information for the lock and wherein the potential owners are the threads in the computer system and the processing includes locating in the stack information for each owner a pointer to the lock.

2. The method of claim 1, further including prior to the processing, examining the core file to identify the lock.

3. The method of claim 1, further including identifying an inactive portion of a current stack for the computer system from the core file and removing the potential owners that have a local variable pointer in the stack information pointing to the inactive portion.

4. The method of claim 1, further including retrieving an analysis rule set for the lock, applying the retrieved analysis rule set to the threads identified in the list of potential owners of the lock, and removing the threads not complying with the analysis rule set from the list of potential owners.

5. The method of claim 1, further including examining the core file for a waiting list for the lock including an identifier for each thread waiting for ownership of the lock and removing from the list of potential owners each of the threads in the list of the potential owners that are included in the waiting list.

6. The method of claim 5, wherein the lock is a read/write lock or a semaphore.

7. The method of claim 1, further including generating a report including the list of potential owners of the lock.

8. A method of determining prior ownership in a computer system of a lock to a resource shared by threads of execution, comprising:

retrieving a set of the threads identified as potential prior owners of the lock;

identifying a stack for the each of the identified threads that is maintained by a processor in the computer system;

determining an active and an inactive portion of each of the thread stacks based on a stack pointer; and for each of the threads, identifying a location in the thread stack of a pointer to the lock;

determining for each of the threads whether the location of the pointer to the lock is in the active or the inactive portion of the thread stack; and removing the threads in the set that have the pointer to the lock in the inactive portion of the thread stack.

9. The method of claim 8, further including retrieving a sleep queue for the lock listing threads waiting for ownership of the lock and removing any of the threads in the set that are listed in the sleep queue for the lock.

10. The method of claim 8, further including generating the set of the potential owner threads by determining for each of the threads in the computer system whether the thread has a pointer to the lock in the stack maintained for the thread.

11. The method of claim 8, further including receiving a core file for the computer system and processing the core file to locate the lock for which ownership is to be determined.

12. A computer-based method for determining lock ownership in a multithreading operating system, comprising:

retrieving a core file for a computer system;

processing the core file to create a set of threads of execution determined to be potential owners of a lock to a resource shared by the threads;

locating a waiting list for ownership to the lock including threads waiting to own the lock; and removing all of the waiting threads from the set of potential owner threads.

13. The method of claim 12, further including identifying stack information for each of the threads in the set including a pointer to the lock, determining for each of the threads whether the pointer to the lock is in an inactive portion of a stack for the thread, and removing the threads having the pointers determined located in the inactive portions of the stacks from the set of potential owner threads.

14. The method of claim 13, wherein the lock is a read/write lock or a semaphore.

15. The method of claim 13, further including generating a report including the set of potential owner threads.

16. The method of claim 12, further wherein the determination of the potential owner threads in the processing includes locating threads of execution in the operating system having a pointer to the lock.

17. A computer readable medium, comprising:

computer readable program code devices configured to cause a computer to effect generating a set of potential owners of a lock to a system resource including threads of execution determined to have a pointer to the lock, wherein the lock is configured for multiple ownership and a kernel associated with the lock does not store lock ownership information for the lock;

computer readable program code devices configured to cause a computer to effect retrieving a set of threads waiting for ownership of the lock; and computer readable program code devices configured to cause a computer to effect removing any of the waiting threads from the set of potential owner threads.

18. The computer readable medium of claim 17, further including computer readable program code devices configured to cause a computer to effect removing the threads in the set of potential owner threads having a pointer to the lock in the inactive portion of the stack for the thread.

19. The computer readable medium of claim 17, further including computer readable program code devices configured to cause a computer to effect identifying the lock from by processing a core file to identify an active lock as a cause of a panic.

20. The computer readable medium of claim 17, wherein the lock is a read/write lock or a semaphore.

* * * * *

UNITED STATES PATENT AND TRADEMARK OFFICE
CERTIFICATE OF CORRECTION

PATENT NO. : 6,886,081 B2  
DATED : April 26, 2005  
INVENTOR(S) : John M. Harres It is certified that error appears in the above-identified patent and that said Letters Patent is hereby corrected as shown below:

Column 8,  
Line 58, insert "potential" after -- each --

Column 10,  
Line 36, insert "identifying a stack for the threads and configured to cause a computer to effect" after -- effect --  
Line 41, delete "from" after -- lock --

Signed and Sealed this

Nineteenth Day of July, 2005

JON W. DUDAS  
*Director of the United States Patent and Trademark Office*